United States Patent
Mizutani et al.

(10) Patent No.: US 11,878,263 B2
(45) Date of Patent: Jan. 23, 2024

(54) EXHAUST GAS PURIFICATION FILTER

(71) Applicant: DENSO CORPORATION, Kariya (JP)

(72) Inventors: Keisuke Mizutani, Nisshin (JP); Kazuhiko Koike, Nisshin (JP); Mikio Ishihara, Kariya (JP)

(73) Assignee: DENSO CORPORATION, Kariya (JP)

( * ) Notice: Subject to any disclaimer, the term of this patent is extended or adjusted under 35 U.S.C. 154(b) by 177 days.

(21) Appl. No.: 17/487,111

(22) Filed: Sep. 28, 2021

(65) Prior Publication Data

US 2022/0047982 A1 Feb. 17, 2022

Related U.S. Application Data

(63) Continuation of application No. PCT/JP2020/006163, filed on Feb. 18, 2020.

(30) Foreign Application Priority Data

Mar. 29, 2019 (JP) .................. 2019-068161

(51) Int. Cl.
*B01D 46/24* (2006.01)
*F01N 3/022* (2006.01)

(52) U.S. Cl.
CPC ....... *B01D 46/2429* (2013.01); *B01D 46/249* (2021.08); *B01D 46/24492* (2021.08); *F01N 3/022* (2013.01); *B01D 2279/30* (2013.01); *F01N 2330/06* (2013.01); *F01N 2330/32* (2013.01)

(58) Field of Classification Search
CPC .......... B01D 46/2429; B01D 46/24492; B01D 46/249; B01D 2279/30; F01N 3/022; F01N 2330/06; F01N 2330/32

USPC ........................................................ 55/523
See application file for complete search history.

(56) References Cited

U.S. PATENT DOCUMENTS

| | | |
|---|---|---|
| 2003/0024220 A1 | 2/2003 | Ishihara et al. |
| 2006/0107641 A1 | 5/2006 | Kasai et al. |
| 2010/0126133 A1 | 5/2010 | Fekety et al. |
| 2012/0134891 A1 | 5/2012 | Boger et al. |
| 2012/0244042 A1 | 9/2012 | Mizutani et al. |
| 2013/0255207 A1 | 10/2013 | Izumi et al. |
| 2014/0070441 A1 | 3/2014 | Boger et al. |
| 2015/0322832 A1* | 11/2015 | Itoh .................. B01D 46/0002 55/495 |

(Continued)

OTHER PUBLICATIONS

International Search Report dated May 12, 2020 issued in corresponding International Patent Application No. PCT/JP2020/006163 (with English translation attached).

*Primary Examiner* — Robert Clemente

(74) *Attorney, Agent, or Firm* — POSZ LAW GROUP, PLC

(57) ABSTRACT

An exhaust gas purification filter is configured to be disposed in an exhaust passage in a gasoline engine. The exhaust gas purification filter includes partition walls including a plurality of pores, a plurality of cells partitioned by the partition walls, and sealing portions alternately sealing ends of a plurality of the cells in the exhaust gas purification filter. The partition walls each have an average pore diameter of more than 16 μm and less than 21 μm, and have a ratio of an average surface opening diameter of the pores in a partition wall surface to the average pore diameter of the partition wall of 0.66 or more and 0.94 or less.

5 Claims, 9 Drawing Sheets

(56) References Cited

U.S. PATENT DOCUMENTS

2015/0367335 A1* 12/2015 Okazaki .................. B01J 35/10
                                                      428/116
2016/0288449 A1   10/2016 Ouchi et al.
2017/0014747 A1*  1/2017 Miyairi ................. F01N 3/0222
2021/0347702 A1* 11/2021 Citriniti ............. B01D 39/2034

* cited by examiner

EXHAUST GAS PURIFICATION FILTER

CROSS-REFERENCE TO RELATED APPLICATION

The present application is a continuation application of International Application No. PCT/JP2020/006163, filed Feb. 18, 2020, which claims priority to Japanese Patent Application No. 2019-068161, filed Mar. 29, 2019. The contents of these applications are incorporated herein by reference in their entirety.

BACKGROUND

1. Technical Field

The present disclosure relates to an exhaust gas purification filter.

2. Related Art

Exhaust gas discharged from an internal combustion engine such as a gasoline engine or a diesel engine contains particulate matter (hereinafter referred to as "PM" as appropriate) referred to as particulates. To collect PM in the exhaust gas to purify the exhaust gas, an exhaust gas purification filter is disposed in an exhaust passage in the internal combustion engine.

SUMMARY

The present disclosure provides an exhaust gas purification filter. As an aspect of the present disclosure, an exhaust gas purification filter is configured to be disposed in an exhaust passage in a gasoline engine. The exhaust gas purification filter includes partition walls including a plurality of pores, a plurality of cells partitioned by the partition walls, and sealing portions alternately sealing ends of a plurality of the cells in the exhaust gas purification filter. The partition walls each have an average pore diameter of more than 16 μm and less than 21 μm, and have a ratio of an average surface opening diameter of the pores in a partition wall surface to the average pore diameter of the partition wall of 0.66 or more and 0.94 or less.

DETAILED DESCRIPTION OF THE PREFERRED EMBODIMENTS

Figure 1:
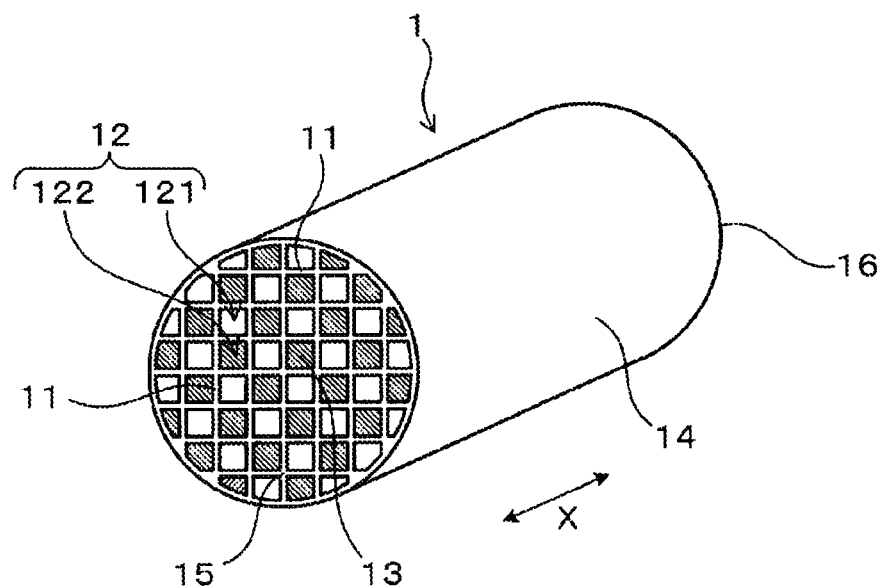
FIG. 1 is a perspective view of an exhaust gas purification filter according to a first embodiment.

As an exhaust gas purification filter disposed in an exhaust passage in the internal combustion engine, for example, JP 2006-95352 A discloses a diesel particulate filter (hereinafter sometimes referred to as "DPF") that collects PM discharged from a diesel engine. The literature specifically discloses, for keeping the pressure drop from being increased with increased PM deposition, a DPF where partition walls that form a plurality of cells are made from a porous base material with a porosity of 45 to 70%, the average pore diameter difference ratio represented by {(A−B)/B}×100 is 35% or less, with an average pore diameter (B) of 15 to 30 μm, in the case where the average pore diameter of the base material, measured by a mercury intrusion technique, and the average pore diameter thereof, measured by a bubble point method, are referred to respectively as (A)μm and (B)μm, and the maximum pore diameter measured by the bubble point method is 150 μm or less.

The amount of PM discharged from the gasoline engine is very much smaller than the amount of PM discharged from the diesel engine. However, restrictions on the number concentration of PM have been introduced, and thus vehicles with the gasoline engine (hereinafter referred to as "gasoline vehicles") need to be equipped with a gasoline particulate filter (hereinafter referred to as "GPF" as appropriate) that can collect PM discharged from the gasoline engine.

The GPF may be coated with catalysts for purifying exhaust gas. The GPF coated with the catalysts may be installed immediately just below the gasoline engine or immediately downstream of a start (S/C) catalyst in view of delivery of exhaust gas purification performance, recycling treatment for accumulated PM, and the like. In this case, an exhaust layout is limited, and thus a reduction in filter volume is desired. However, a reduced filter volume leads to an increase in the pressure drop (also can be referred to as "pressure loss"). Additionally, the gasoline engine involves hot exhaust gas flowing at high velocity and is thus more likely to suffer an increased pressure drop than the diesel engine. In addition, closure of pores in partition walls with the catalyst coat causes an increase in pressure drop. Thus, the GPF is required to reduce an initial pressure drop.

Additionally, a very small amount of PM is discharged from the gasoline engine as described above. Thus, the GPF requires a very long term until the PM accumulation transitions from partition wall inner-portion accumulation to partition wall outer-portion accumulation (wall accumulation) compared to the DPF that collects PM discharged from the diesel engine. In some cases, the GPF fails to transition to the partition wall outer-portion accumulation. Additionally, coating with the catalysts closes the pores in the partition walls, reducing a PM collection rate. Thus, the GPF is required to achieve the initial PM collection rate.

In addition, the PM contains ash components derived from engine oil or the like, besides solid carbon (soot). The ash components are components remaining after PM recycling treatment. For gasoline vehicles, it may be required to suppress an increase in pressure drop caused by residual ash components accumulated due to long-term use. Note that although the DPF suffers an increased pressure drop caused by residual ash components accumulated due to long-term use, exhaust gas has low temperature and the exhaust layout is less limited and thus that suppression of an increase in pressure drop after accumulation of ash components has not been considered to be a major challenge.

An object of the present disclosure is to provide an exhaust gas purification filter that enables a reduction in initial pressure drop, achievement of the initial PM collection rate, and suppression of an increase in pressure drop after accumulation of ash components.

An aspect of the present disclosure is an exhaust gas purification filter configured to be disposed in an exhaust passage in a gasoline engine, the exhaust gas purification filter including:
  partition walls each including a plurality of pores;
  a plurality of cells partitioned by the partition wails; and
  sealing portions alternately sealing ends of the plurality of the cells in the exhaust gas purification filter, wherein
  the partition walls each:
    have an average pore diameter of more than 16 μm and less than 21 μm; and
    have a ratio of an average surface opening diameter of the pores in a partition wall surface to the average pore diameter of the partition wall of 0.66 or more and 0.94 or less.

The exhaust gas purification filter has the particular configuration described above, and in particular, has a specific numerical range of the average pore diameter of the partition wall and a specific numerical range of a ratio of the average surface opening diameter of the pores in the partition wall surface to the average pore diameter of the partition wall. Thus, the exhaust gas purification filter described above enables a reduction in initial pressure drop, achievement of the initial PM collection rate, and suppression of an increase in pressure drop after accumulation of ash components.

Note that parenthesized reference symbols recited in claims indicate correspondence relations with specific means described below in embodiments and are not intended to limit the technical scope of the present disclosure.

The above-described and other objects, features, and advantages will be clarified by the following detailed description with reference to the accompanied drawings.

Embodiments of the present disclosure are described below with reference to the drawings.

First Embodiment

Figure 2:
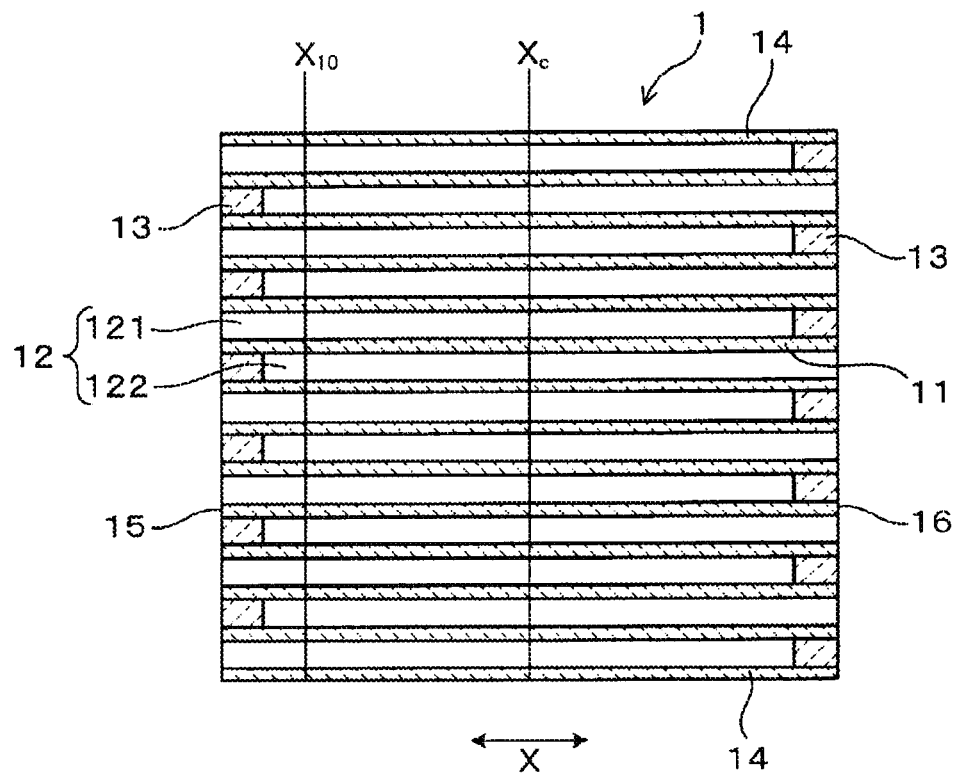
FIG. 2 is an axial cross-sectional view of the exhaust gas purification filter according to a first embodiment.
Figure 3:
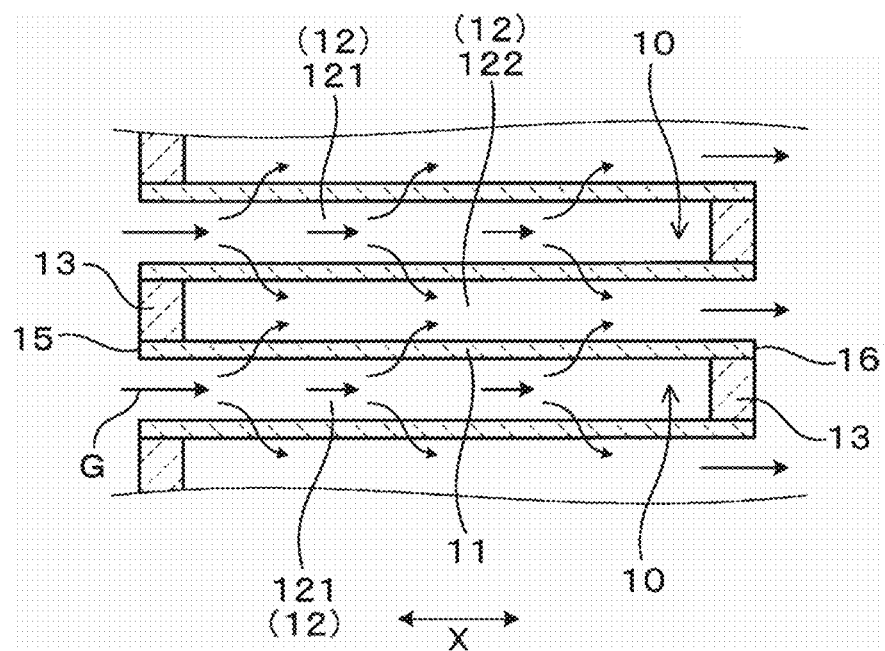
FIG. 3 is a diagram illustrating a flow of exhaust gas in the exhaust gas purification filter according to a first embodiment.

An exhaust gas purification filter according to a first embodiment will be described using FIGS. 1 to 15. As illustrated in FIGS. 1 to 3, an exhaust gas purification filter 1 of the present embodiment is disposed and used in an exhaust passage (not illustrated) in a gasoline engine. In other words, the exhaust gas purification filter 1 is a gasoline particulate filter (GPF) that can collect PM 2 (see FIG. 6 described below) discharged from the gasoline engine. Note that the direction of a double-headed arrow illustrated in FIGS. 1 to 3 is assumed to be a filter axial direction X of the exhaust gas purification filter 1.

The exhaust gas purification filter 1 includes partition walls 11, a plurality of cells 12, and sealing portions 13. As illustrated in FIG. 1 and FIG. 2, the partition walls 11 can be provided inside a skin portion 14 formed in a tubular shape such as a cylindrical shape such that the partition walls 11 are shaped like a grid or the like as viewed in cross section perpendicular to the filter axial direction X. In the exhaust gas purification filter 1, the partition walls 11 and the skin portion 14 are formed of, for example, cordierite or the like. Additionally, the sealing portions 13 can be formed of ceramics such as cordierite but any other suitable material may be used.

The plurality of cells 12 are formed by being partitioned by the partition walls 11. Each of the cells 12 is enclosed by the partition wails 11 to form a gas channel. An extending direction of the cell 12 normally aligns with the filter axial direction X. The cell can be shaped like a rectangle as viewed in cross section perpendicular to the filter axial direction X as illustrated in FIG. 1. The cell is limited to this shape but may be shaped like, for example, a polygon such as a triangle or a hexagon, a circle, or the like. Additionally, the cell shape may be formed from a combination of two or more types of different shaped.

As illustrated in FIG. 2, the plurality of cells 12 are alternately sealed by the sealing portions 13 at ends of the filter. Specifically, the plurality of cells 12 include first cells 121 that are open in an exhaust gas inflow side filter end surface 15 (upstream side end surface) and dosed by the sealing portions 13 in an exhaust gas outflow side filter end surface 16 (downstream side end surface) and second cells 122 that are open in the exhaust gas outflow side filter end surface 16 and are closed by the sealing portions 13 in the exhaust gas inflow side filter end surface 15. Thus, as illustrated in FIG. 3, exhaust gas G flowing into the first cell 121 through the exhaust gas inflow side filter end surface 15 flows through the first cell 121 and also flows through the partition walls 11, which are porous, into the second cell 122. The exhaust gas G having entered the second cell 122 flows through the second cell 122 and is discharged through the exhaust gas outflow side filter end surface 16.

The first cells 121 and the second cells 122 can be formed alternately in juxtaposition adjacently to one another both in a lateral direction orthogonal to the filter axial direction X and a vertical direction orthogonal to both the filter axial direction X and the lateral direction. In this case, when the exhaust gas inflow side filter end surface 15 or the exhaust gas outflow side filter end surface 16 is viewed in the filter axial direction X, the first cells 121 and the second cells 122 are arranged, for example, in a checkered pattern. The first cell 121 and the second cell 122 adjacent to each other are separated from each other via the partition wall 11.

Figure 7:
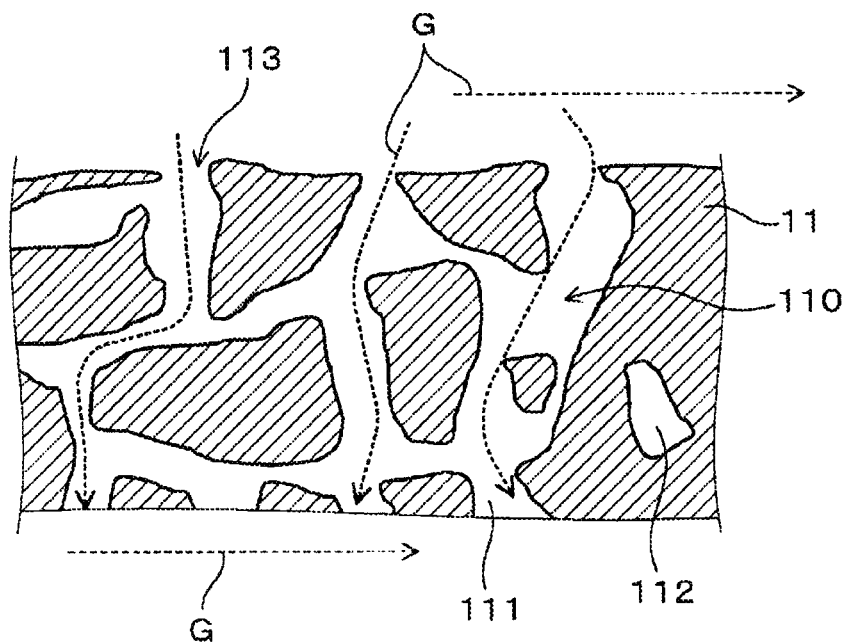
FIG. 7 is a cross-sectional view of a partition wall corresponding to an enlarged view of a partition wall front surface side into which exhaust gas flows.

As illustrated in FIG. 7, each of the partition walls 11 includes a large number of pores 110. The pores 110 in the partition wall 11 includes communication pores 111. The communication pores 111 specifically allows for communication between the first cell 121 and the second cell 122 adjacent to each other. In addition to the communication pores 111, the pores 110 in the partition walls 11 may include non-communication pores 112 that do not communicate with the first cell 121 and the second cell 122 adjacent to each other.

In the exhaust gas purification filter 1, the average pore diameter of the partition wall 11 (in other words, the average pore diameter inside the partition wall 11) is within the range of more than 16 μm and less than 21 μm.

The average pore diameter of the partition wall 11 is measured by a mercury porosimeter using the principle of a mercury intrusion technique. Specifically, a test piece is cut out from the exhaust gas purification filter 1. However, no portions provided with the sealing portion 13 are cut out. The partition wall piece is shaped like a rectangular parallelepiped having a size of 15 mm by 15 mm in a direction orthogonal to the filter axial direction X and a length of 20 mm in the filter axial direction X. Then, the test piece is housed in a measurement cell of the mercury porosimeter, and the inside of the measurement cell is depressurized. Subsequently, mercury is introduced into the measurement cell and pressurized, and the pore diameter and the pore volume are measured using the pressure during the pressurization and the volume of mercury introduced into the pores 110 in the partition wall 11 in the test piece. The measurement is performed at a pressure range of 0.5 psia or more and 20,000 psia or less. Note that 0.5 psia corresponds to $0.35 \times 10^{-3}$ kg/mm$^2$ and that 20,000 psia corresponds to 14 kg/mm$^2$. The range of the pore diameter corresponding to this pressure range is 0.01 μm or more and 420 μm or less. As constants for calculation of the pore diameter from the pressure, a contact angle of 140° and a surface tension of 480 dyn/cm are used. The average pore diameter refers to a pore diameter (the pore diameter corresponding to a 50% integrated value of the pore volume) in the pore diameter distribution of the partition wall 11 which diameter corresponds to a 50% cumulative pore volume.

In the exhaust gas purification filter 1, a ratio of the average surface opening diameter of the pores 110 in the partition wall 11 surface to the average pore diameter of the partition wall 11 is within the range of 0.66 or more and 0.94 or less. The average surface opening diameter of the pores 110 in the partition wall 11 surface is measured as follows.

Figure 4:
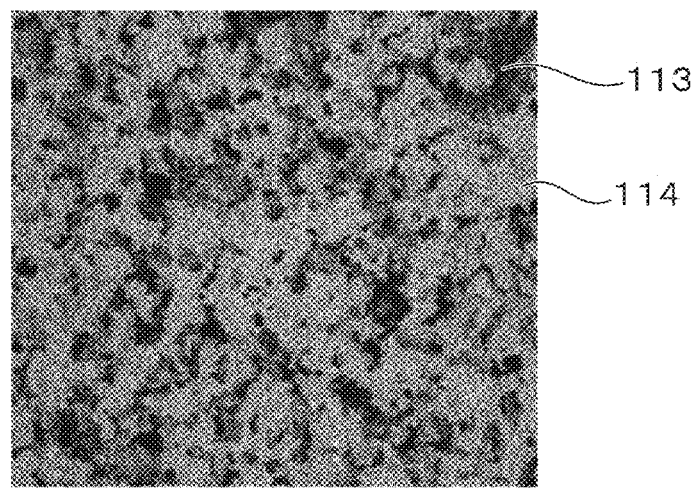
FIG. 4 is a diagram illustrating an example of a backscattered electron image of a partition wall surface via a scanning electron microscope which image is acquired when the surface opening diameter of pores in the partition wall surface is measured in the exhaust gas purification filter according to a first embodiment.
Figure 5:
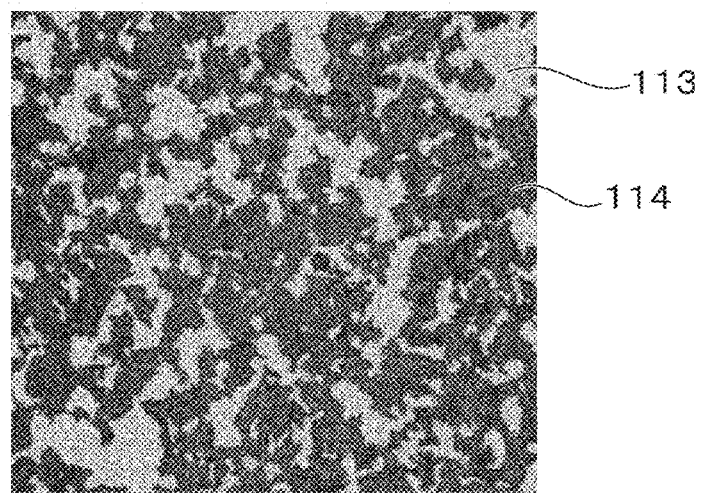
FIG. 5 is a diagram illustrating an example of a binarized image formed by binarization processing executed on the backscattered electron image in FIG. 4.

Surface openings 113 of the pores 110 are formed in the partition wall 11 surface on the exhaust gas G inflow side and in the partition wall 11 surface on the exhaust gas G outflow side. In this regard, a scanning electron microscope (SEM) is used to acquire a backscattered electron image of the partition wall 11 surface on the exhaust gas G inflow side (in other words, the partition wall 11 surface facing the first cells 121). However, for the portion of the partition wall 11 surface in which the sealing portion 13 is present, no backscattered electron image is acquired. At this time, the microscope has an acceleration voltage of 10 kV and magnification of 300. FIG. 4 illustrates an example of a backscattered electron image of the partition wall 11 surface. In the backscattered electron surface in FIG. 4, black areas correspond to surface openings 113 in the partition wall 11 surface, and pale gray areas correspond to frame portions 114 of the partition wall 11 surface. Then, image analysis software (WinROOF, manufactured by MITANI CORPORATION) is used to execute binarization processing on captured images. The binarization processing is intended to distinguish the surface openings 113 in the partition wall 11 surface from the frame portions 114 in the partition wall 11 surface. The surface opening 113 and the frame portion 114 have different luminances, and thus in the binarization processing, noise remaining in the captured image is removed, and any threshold is set before the binarization processing is executed. Different captured images have different thresholds, and thus with the captured images visually checked, a threshold is set for each captured image, the threshold allowing the captured image to be separated into the surface openings 113 and the frame portions 114. FIG. 5 illustrates an example of a binarized image. In the binarized image in FIG. 5, pale gray areas correspond to the surface openings 113 in the partition wall 11 surface, and the black areas correspond to the frame portions 114 in the partition wall 11 surface. For the surface openings 113 in the resultant binarized image, an equivalent circle diameter is calculated for each surface opening 113, the equivalent circle diameter corresponding to the diameter of a perfect circle having the same area as that of the surface opening 113. All the equivalent circle diameters calculated are integrated, and the result is divided by the number of the surface openings 113 to obtain a value of the surface opening diameter. The average value of the surface opening diameters determined for any five different points on the partition wall 11 surface and obtained from each binarized image is used as the average surface opening diameter of the pores 110 in the partition wall 11 surface. Then, the average surface opening diameter of the pores 110 in the partition wall 11 surface is divided by the average pore diameter of the partition wall 11 to obtain the ratio of the average surface opening diameter of the pores 110 in the partition wall 11 surface to the average pore diameter of the partition wall 11. That is to say, the above ratio of the average surface opening diameter can be calculated using the expression of (the average surface opening diameter of the pores 110 in the partition wall 11 surface)/(the average pore diameter of the partition wall 11).

For the exhaust gas purification filter 1, the average pore diameter of the partition wall 11 defined as described above is within the above specific numerical range. The ratio of the average surface opening diameter of the pores 110 in the partition wall 11 surface to the average pore diameter of the partition wall 11 is within the above specific numerical range. Thus, the exhaust gas purification filter 1 enables a reduction in initial pressure drop, achievement of the initial PM collection rate, and suppression of an increase in pressure drop after accumulation of ash components. A mechanism for producing such effects will be described using FIGS. 6 to 12.

Figure 6:
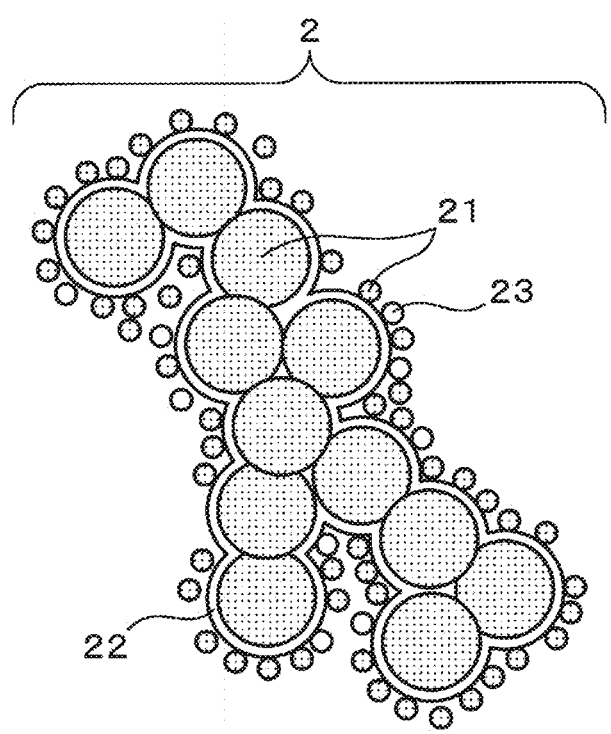
FIG. 6 is a diagram schematically illustrating a microstructure of PM.
Figure 8:
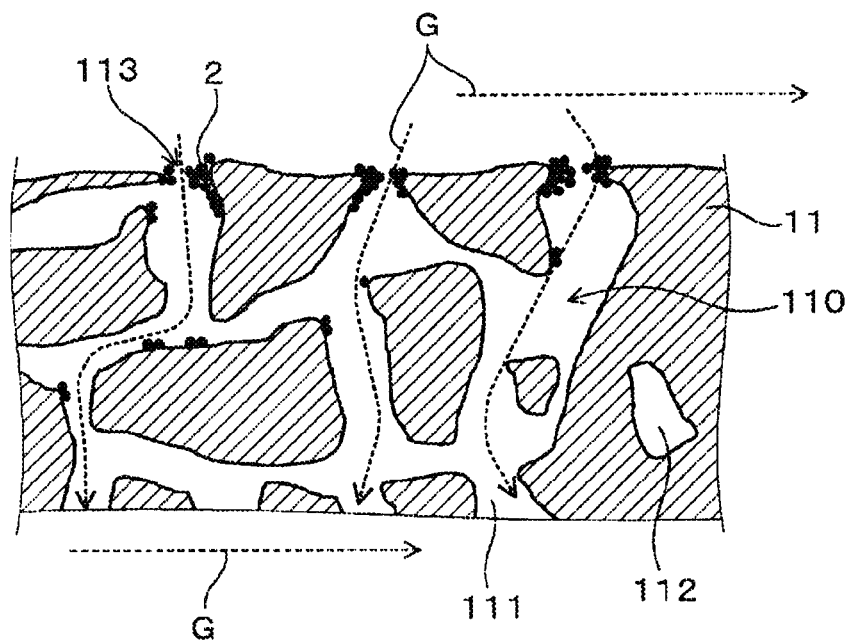
FIG. 8 is a diagram illustrating areas around surface openings in the partition wall where PM is segregated, the partition wall being illustrated in FIG. 7.
Figure 9:
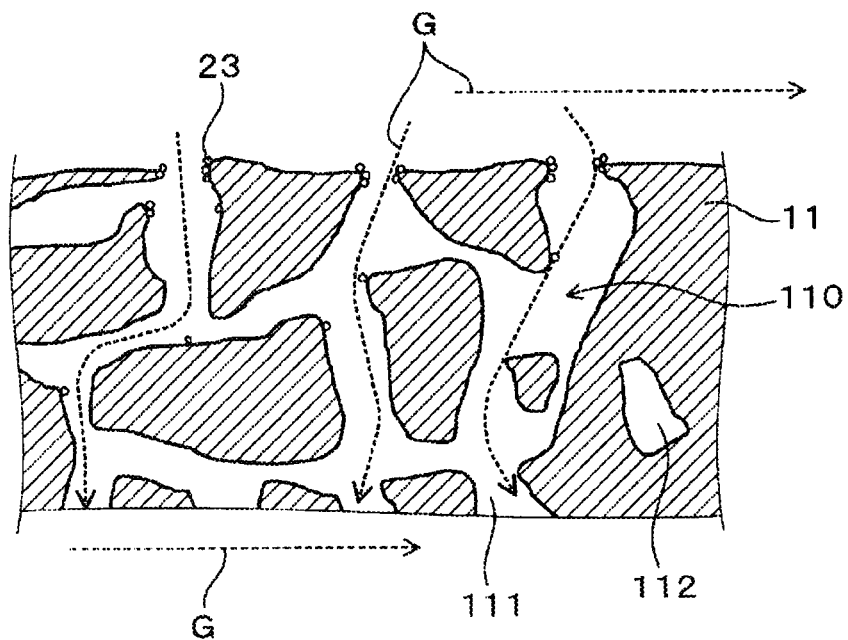
FIG. 9 is a diagram illustrating ash components contained in the PM illustrated in FIG. 8, the ash components remaining after the PM is subjected to recycling treatment.
Figure 10:
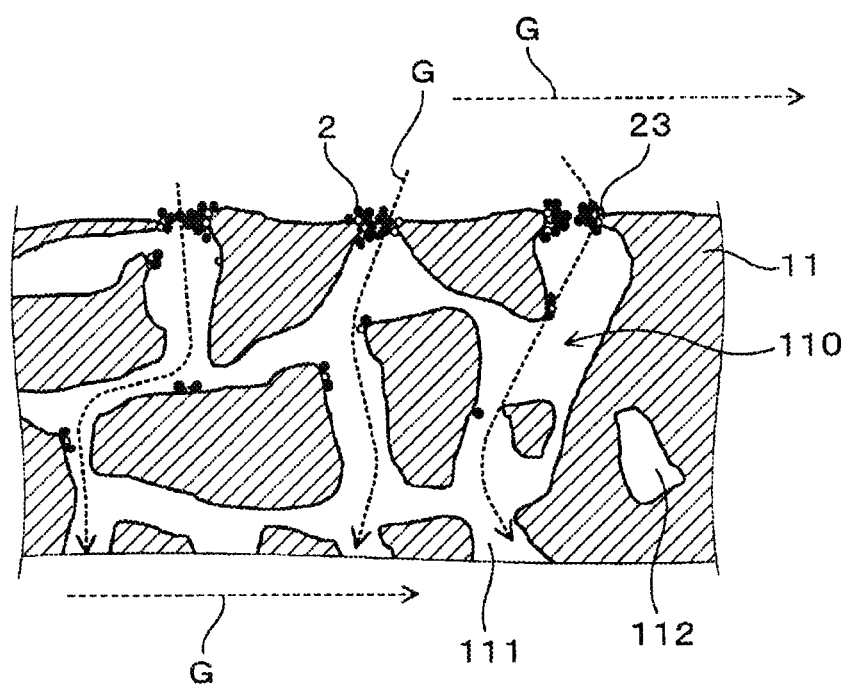
FIG. 10 is a diagram illustrating PM being redeposited while ash components illustrated in FIG. 9 remain.
Figure 11:
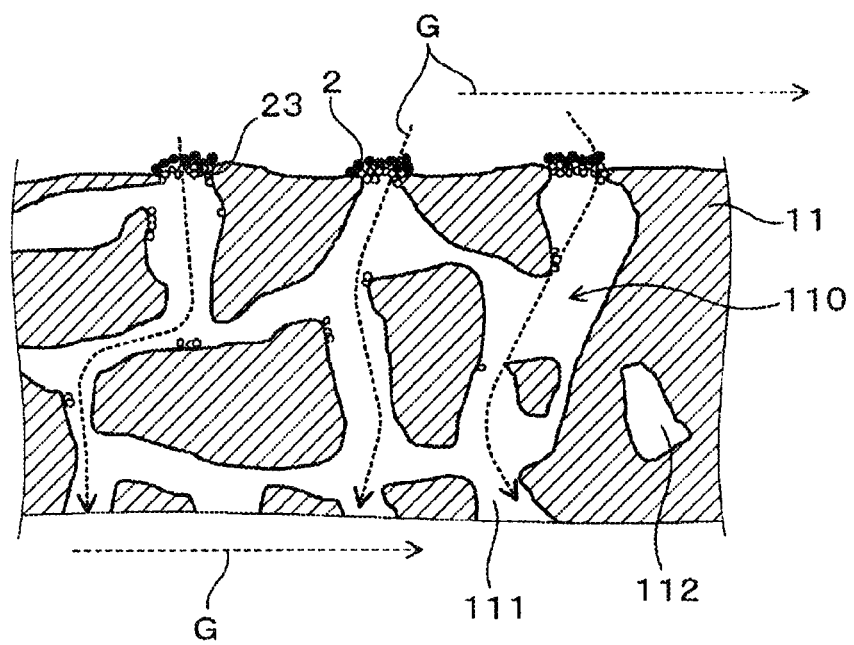
FIG. 11 is a diagram illustrating surface openings of pores in the partition wall surface being crosslinked by the ash components due to further repetition of accumulation of PM and PM recycling treatment in the state in FIG. 10.
Figure 12:
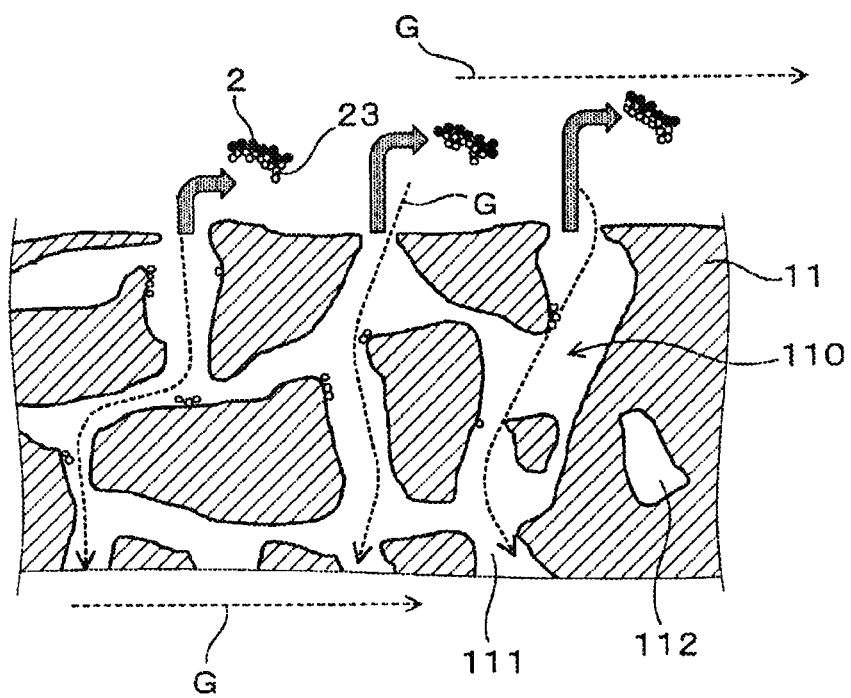
FIG. 12 is a diagram illustrating the ash components that have become crosslinked at the surface openings illustrated in FIG. 11 being detached by a flow of exhaust gas, the detached ash components being transported to a gas outflow side sealing portion.

As illustrated in FIG. 6, PM 2 includes soluble organic fractions (SOFs) 22 and ash components (Ash) 23 derived from engine oil and the like, in addition to solid carbon (soot) 21 corresponding to a main component. As illustrated in FIG. 7, the PM 2 is collected while passing through the pores 110 in the partition wail 11. Note that arrows in FIG. 7 indicate flows of the exhaust gas G flowing through the pores 110. When the average pore diameter of the partition wall 11 and the ratio of the average surface opening diameter of the pores 110 in the partition wall 11 surface to the average pore diameter of the partition wall 11 respectively are within the above specific numerical ranges, the PM 2 is segregated in areas around the surface openings 113 formed in the partition wall 11 surface on the exhaust gas G inflow side as illustrated in FIG. 8 in a case where PM 2 containing the ash components 23 is collected in the partition wall 11 having the above specific numerical ranges. Furthermore, as illustrated in FIG. 9, the ash components 23 contained in the PM 2 remain after the PM 2 is subjected to recycling treatment. As illustrated in FIG. 10, in a case where with the ash components 23 remaining, the PM 2 containing the ash components 23 is collected in the partition wall 11 again, the PM 2 is segregated in areas around the surface openings 113 in the partition wall 11 surface and also accumulates in areas around the ash components 23. As illustrated in FIG. 11, repetition of accumulation of the PM 2 containing the ash components 23 and PM 2 recycling treatment causes the ash components 23 to crosslink at the surface openings 113 in the partition wall 11 surface. Subsequently, as illustrated in FIG. 12, the ash components 23 crosslinking at the surface openings 113 are detached during, the PM 2 recycling treatment or due to the flow of the exhaust gas G, and the detached ash components 23 are transported to the sealing portions 13 on the gas outflow side. The transported ash components 23 are accumulated at a filter most downstream portion 10 (see FIG. 3, can also be referred to as a filter bottom portion). The ash components 23 covering an outer surface of the partition wall 11 increase pressure drop, whereas the ash components 23 accumulated at the filter most downstream portion 10 is unlikely to increase pressure drop. In other words, when the average pore diameter of the partition wall 11 and the ratio of the average surface opening diameter of the pores 110 in the partition wall 11 surface to the average pore diameter of the partition wall 11 respectively are within the above specific numerical ranges, employment of the partition wall 11 having the above specific numerical ranges causes crosslinking of the ash components 23 at the surface openings 113 in the partition wall 11, leading to the likelihood of peel-off of the ash components 23 described above. As a result, the amount of ash components 23 accumulated at the filter most downstream portion 10 can be made larger than the amount of ash components 23 covering the outer surface of the partition wall 11. With an increased amount of ash components 23 accumulated at the filter most downstream portion 10, the gas permeability of the partition wall 11 is improved after accumulation of the ash components 23, leading to a reduced pressure drop. The above-described mechanism is expected to achieve both a reduction in initial pressure drop and achievement of the initial PM collection rate in the exhaust gas purification filter 1 in a compatible mariner and to enable suppression of an increase in pressure drop after accumulation of the ash components 23.

In the exhaust gas purification filter 1, the average pore diameter of 16 μm or less in the partition wall 11 reduces the effect of reducing the initial pressure drop. On the other hand, the average pore diameter of 21 μm or more in the partition wall 11 decreases the initial PM collection performance, thereby also making the pressure drop after accumulation of the ash components 23 more likely to increase.

When the ratio of the average surface opening diameter of the pores 110 in the partition wall 11 surface to the average pore diameter of the partition wall 11 is smaller than 0.66 the effect of reducing the initial pressure drop will be reduced. On the other hand, the ratio of the average surface opening diameter of the pores 110 in the partition wall 11 surface to the average pore diameter of the partition wall 11 being greater than 0.94 makes the PM 2 containing the ash components 23 likely to enter the pores 110 in the partition wall 11, leading to the likelihood of accumulation of the ash components 23. Thus, the ash components 23 are less likely to become detached, and long-term use of a vehicle causes accumulation and remaining of the ash components 23, increasing the pressure loss.

In the exhaust gas purification filter 1, a presence ratio of the surface opening diameter of 25 μm or more of the pores 110 in the partition wall 11 surface on the exhaust gas G inflow side can be set to 20% or less. With the presence ratio of the surface opening diameter of 25 μm or more in the partition wall 11 surface being 20% or less, the PM 2 containing the ash components 23 is less likely to accumulate inside the partition wall 11, thus facilitating suppression of an increase in pressure loss due to accumulation and remaining of the ash components 23 caused by long-term use of the vehicle. In view of a reduction in initial pressure loss and the like, the presence ratio of the surface opening diameter of 25 μm or more of the pores 110 in the partition wall 11 surface can preferably be set to 10% or more.

The presence ratio of the surface opening diameter of 25 μm or more of the pores 110 in the partition wall 11 surface can be determined by calculating the frequency of appearance of the surface opening of the surface opening diameter of 25 μm or more, based on each surface opening diameter of the pores 110 in the partition wall 11 surface obtained from all the binarized images described above. Specifically, the presence ratio Ab of the surface opening diameter of 25 μm or more is calculated based on each surface opening diameter of the pores 110 obtained from the binarized image of the partition wall 11 surface. The average value of presence ratios Ab of the surface opening diameters of 25 μm or more determined for any five different points on the partition wall 11 surface and obtained from each binarized image is used as presence ratio of the surface opening diameter of 25 μm or more of the pores 110 in the partition wall 11 surface.

In the exhaust gas purification filter 1, the surface opening ratio of the pores 110 in the partition wall 11 surface on the exhaust gas G inflow side can be set to 30% or more and 40% or less. With the surface opening ratio of the pores 110 in the partition wall 11 surface being 30% or more, the effect of reducing the initial pressure drop is easily produced. Additionally, with the surface opening ratio of the pores 110 in the partition wall 11 surface being 40% or less, the PM 2 containing the ash components 23 is less likely to accumulate inside the partition wall 11, thus suppressing an increase in the pressure drop after accumulation of ash components 23.

The surface opening ratio of the pores 110 in the partition wall 11 surface can be calculated using the expression of 100×(total value of areas of surface openings 113 in all the binarized images described above)/(total value of areas of all binarized images). "All the binarized images" means binarized images of five points described above.

In the exhaust gas purification filter 1, the porosity of the partition wall 11 can be set to 60% or more and 70% or less. With the porosity of the partition wall 11 being 60% or more, a reduction in initial pressure drop and improvement of the PM collection performance are facilitated. Additionally, with the porosity of the partition wall 11 being 70% or less, the strength of the exhaust gas purification filter 1 itself is easily achieved, thus facilitating suppression of stress during casing and cracking due to heat during the recycling treatment of the PM 2. In view of a reduction in initial pressure drop, improvement of the PM collection performance and the like, the porosity of the partition wall 11 can preferably be set to 62% or more and more preferably 63% or more. In addition, in view of an increase in the intensity of the exhaust gas purification filter 1 and the like, the porosity of the partition wall 11 can preferably be set to 68% or less, more preferably 67% or less, and much more preferably 66% or less. Note that these upper and lower limits can be optionally combined.

The porosity of the partition wall 11 is measured by the mercury porosimeter using the principle of the mercury intrusion technique described above. Specifically, the porosity of the partition wall 11 can be calculated by the relationship expression below.

Porosity (%) of Partition Wall 11=Total Pore Volume/(Total Pore Volume+1/Absolute Specific Gravity of Partition Wall Material)×100

Note that in a case where the partition wall material is cordierite, 2.52 can be used as the absolute specific gravity of cordierite.

The exhaust gas purification filter 1 can be configured such that with 20 g/L or more and 40 g/L or less ash components 23 accumulated, the partition wall 11 has a gas permeability coefficient $k_{10}$ at a position $X_{10}$ (see FIG. 2) 10 mm away from the exhaust gas inflow side filter end surface 15 and the partition wall 11 has a gas permeability coefficient $k_c$ at a central position $X_c$ (see FIG. 2) between the exhaust gas inflow side filter end surface 15 and the exhaust gas outflow side filter end surface 16. The exhaust gas purification filter 1 can be configured such that a value of a gas permeability coefficient ratio calculated using the expression of $k_c/k_{10}$ is 1.5 or less. This configuration allows reliable suppression of an increase in pressure drop after accumulation of the ash components.

In the above-described configuration, with the amount of ash components 23 accumulated being less than 20 g/L, no ash components 23 accumulate on the outer portion of the partition wall 11 at the position $X_{10}$ 10 mm away from the exhaust gas inflow side filter end surface 15 or at the central position $X_c$ between the exhaust gas inflow side filter end surface 15 and the exhaust gas outflow side filter end surface 16, or only a slight amount of ash components 23 accumulate. Thus, the effect of peel-off of the ash components 23 is difficult to recognize. Consequently, in the above-described configuration, the amount of ash components 23 accumulated is 20 g/L or more. On the other hand, with the amount of ash components 23 accumulated being more than 40 g/L, a larger amount of ash components 23 detach and accumulate at the filter most downstream portion 10, and this affects even the central position $X_c$ between the exhaust gas inflow side filter end surface 15 and the exhaust gas outflow side filter end surface 16. Thus, the effect of peel-off of the ash components 23 is difficult to recognize. Consequently, in the above-described configuration, the amount of ash components 23 accumulated is 40 g/L or less.

$k_c/k_{10}$ is an indicator indicating the magnitude relationship between a gas permeability coefficient $k_c$ and a gas permeability coefficient $k_{10}$. The gas permeability coefficient of the partition wall 11 has a value decreasing with increasing amount of ash components 23 accumulated. Additionally, the flow velocity of the exhaust gas G introduced into the cell 12 in the exhaust gas purification filter 1 is higher at the position $X_{10}$ 10 mm away from the exhaust gas inflow side filter end surface 15 than at the central position $X_c$ between the exhaust gas inflow side filter end surface 15 and the exhaust gas outflow side filter end surface 16. In other words, the amount of ash components 23 accumulated is greater at the position $X_{10}$ 10 mm away from the exhaust gas inflow side filter end surface 15 than at the central position $X_c$ between the exhaust gas inflow side filter end surface 15 and the exhaust gas outflow side filter end surface 16. In this regard, in a case where the amount of ash components 23 accumulated is replaced with the gas permeability coefficient, the relationship between the gas permeability coefficient $k_{10}$ and the gas permeability coefficient $k_c$ after accumulation of the ash components 23 is such that the gas permeability coefficient $k_c$ is greater than the gas permeability coefficient $k_{10}$. In other words, known exhaust gas purification filters not including the configuration of the present disclosure typically have large $k_c/k_{10}$ values. As described below in experiment examples, specifically a $k_c/k_{10}$ value of more than 1.5 increases the pressure drop increase rate after accumulation of the ash components 23 with respect to the initial pressure drop. This may be because the ash components 23 on the surface of the partition wall 11 at the position $X_{10}$ 10 mm away from the exhaust gas inflow side filter end surface 15 are not detached and accumulate in the pores 110. Consequently, the $k_c/k_{10}$ value is preferably 1.5 or less in order to suppress the pressure drop increase rate. This may be because the peel-off of the ash components 23 from the surface of the partition wall 11 is promoted in an area around the position $X_{10}$ 10 mm away from the exhaust gas inflow side filter end surface 15. Of course, not all of the ash components 23 are detached and are transported to and accumulated in areas around the sealing portions 13 at the filter most downstream portion 10. Some of the ash components 23 remain in the partition wall 11 or near the partition wall 11 surface. As a result, with the $k_c/k_{10}$ value being 1.5 or less, the pressure drop increase rate with respect to the initial pressure drop can be kept small after accumulation of the ash components 23.

Note that the gas permeability coefficients $k_{10}$ and $k_c$ are measured as follows. First, 20 g/L or more and 40 g/L or less ash components 23 are accumulated in the exhaust gas purification filter 1. The ash components 23 can he accumulated by activating the gasoline engine using gasoline containing 2% ash components derived from engine oil to accumulate ash components 23 in the exhaust gas purification filter 1 mounted in the exhaust passage. Specifically, (1) in a stoichiometric atmosphere, the PM 2 is accumulated for nine minutes with the central temperature of the exhaust gas purification filter 1 set at 800° C., and (2) in an air atmosphere, the PM 2 is subjected to the recycling treatment for one minute with the central temperature of the exhaust gas purification filter 1 set between 800° C. and 900° C. The accumulation of the PM 2 in (1) described above and the PM 2 recycling treatment in (2) described above are repeated to accumulate the ash components 23 in the exhaust gas purification filter 1. The amount of ash components 23 accumulated can be determined by extracting the exhaust gas purification filter 1 and measuring the weight of the exhaust gas purification filter 1 as appropriate.

Then, from the exhaust gas purification filter 1 in which the predetermined amount of ash components 23 are accumulated, measurement samples including no sealing portions 13 are cut out at the position $X_{10}$ 10 mm away from the exhaust gas inflow side filter end surface 15 and at the central position $X_c$ between the exhaust gas inflow side filter end surface 15 and the exhaust gas outflow side filter end surface 16. At this time, the measurement sample at the position $X_{10}$ is collected such that the position 10 mm away from the exhaust gas inflow side filter end surface 15 corresponds to an upstream side end surface. On the other hand, the measurement sample at the central position $X_c$ is collected such that the central position $X_c$ corresponds to an upstream side end surface. Each measurement sample is shaped like a cylinder with a diameter of 30 mm and a filter axial direction length of 25 mm. Note that the skin portion 14 of each measurement sample cut out from the exhaust gas purification filter 1 can be formed, for example, by cementing.

Figure 13:
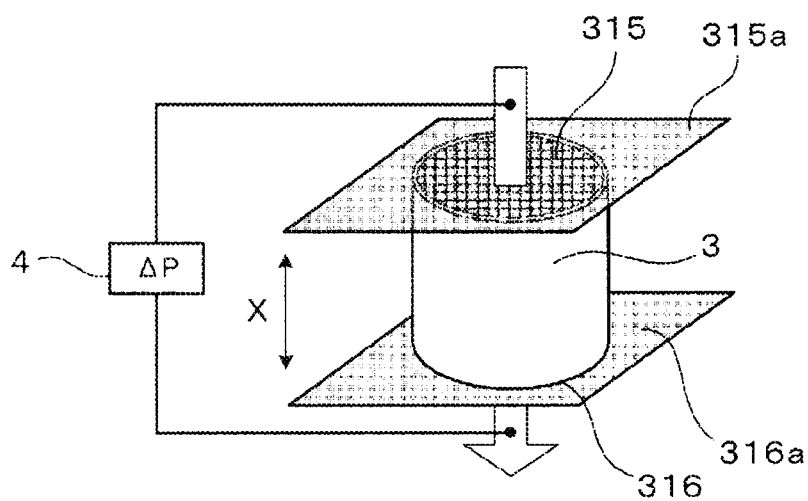
FIG. 13 is a diagram illustrating a method for measuring a gas permeability coefficient of the exhaust gas purification filter.
Figure 14:
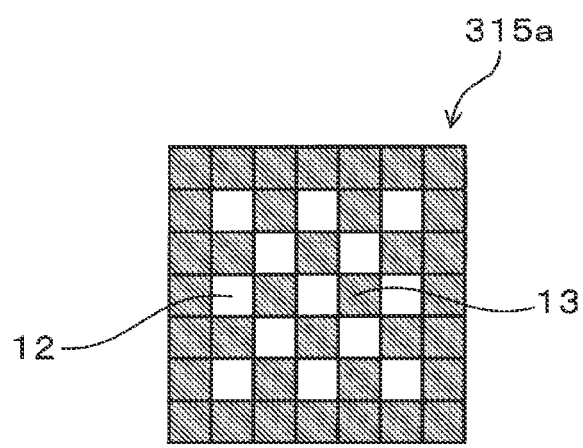
FIG. 14A is a diagram illustrating an example of a tape for formation of sealing portions attached to an upstream side end surface of a measurement sample collected from the exhaust gas purification filter.
FIG. 14B is a diagram illustrating an example of a tape for formation of sealing portions attached to a downstream side end surface of a measurement sample collected from the exhaust gas purification filter.
Figure 14B:
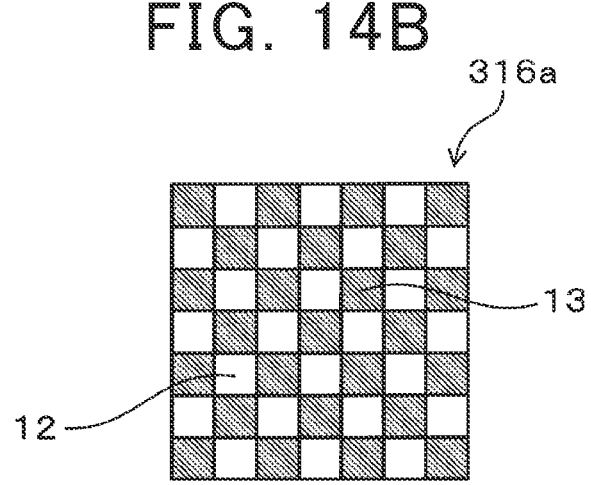

Then, as illustrated in FIG. 13, polyester tapes 315a and 316a are respectively attached to end surfaces 315 and 316 of the measurement sample 3 in the filter axial direction X. Then, for example, a soldering iron or the like is used to partially remove the polyester tapes 315a and 316a such that the polyester tapes 315a and 316a form the alternate sealing portions 13. In this manner, in an upstream side end surface 315 corresponding to the exhaust gas inflow side filter end surface of the measurement sample 3, for example, 13 cells 12 are opened and the remaining cells 12 are closed with the sealing portions 13 formed of the polyester tape 315a, as illustrated in FIG. 14A. On the other hand, in a downstream side end surface 316 corresponding to the exhaust gas outflow side filter end surface of the measurement sample 3, for example, 24 cells 12 are opened and the remaining cells 12 are closed with the sealing portions 13 formed of the polyester tape 316a, as illustrated in FIG. 14B. In other words, instead of the sealing portions 13 made of ceramics, the sealing portions 13 made of the polyester tapes 315a and 316a are formed. Note that for the measurement of the gas permeability coefficient, the measurement sample 3 has been described that includes the sealing portions 13 formed of the polyester tapes 315a and 316a but that similar effects are produced by using the measurement sample 3 including the sealing portions 13 formed of ceramics.

Figure 15:
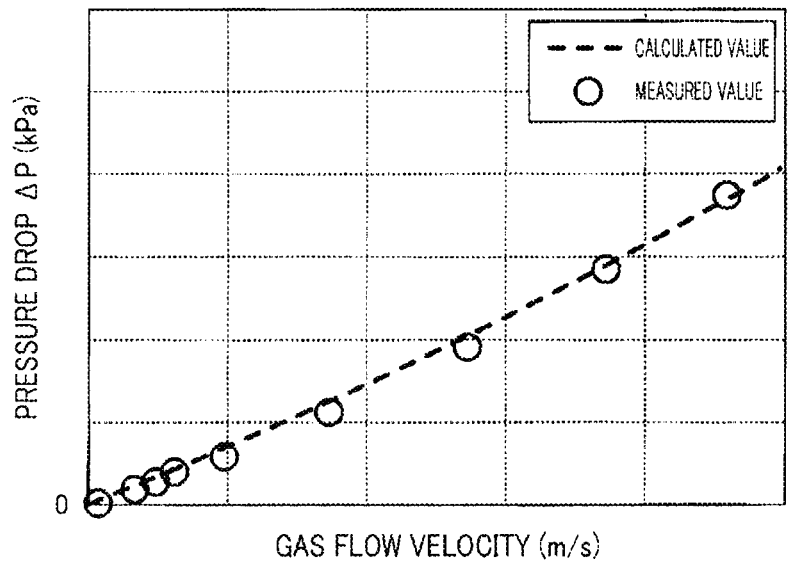
FIG. 15 is a diagram illustrating an example of a relationship diagram of a relationship between a gas flow velocity (X axis) and pressure drop (Y axis)

Now, as illustrated in FIG. 13, gas is caused to flow from the upstream side end surface 315 of the measurement sample 3 toward the downstream side end surface 316 of the measurement sample 3, and a perm porometer 4 is used to measure the relationship between the gas flow velocity and the pressure drop. Specifically, the pressure drop is measured when the gas flow velocity is changed. Note that an arrow in FIG. 13 indicates a flow of the gas. Then, a relationship diagram of a relationship between the gas flow velocity (X axis) and the pressure drop (Y axis) is created. FIG. 15 illustrates an example of a relationship diagram of the relationship between the gas flow velocity (X axis) and the pressure drop (Y axis). The relationship diagram indicates measured values (plot points) obtained by the perm porometer 4 and calculated values (dashed line) determined by Equations (i) to (viii). Equations (i) to (viii) be described below.

The relationship in Equation (i) below is satisfied by the pressure drop $\Delta P$ (unit: Pa) of the exhaust gas purification filter 1, the sum $\Delta P_{inlet/exit}$ of a condensation pressure drop $\Delta P_{inlet}$ occurring when the gas flows into the cell 12 and an enlargement pressure drop $\Delta P_{exit}$ occurring when the gas flows out of the cell 12, a pressure drop $\Delta P_{channel}$ (unit: Pa) caused by the passage of the gas through the cell 12, and a pressure drop $\Delta P_{wall}$ (unit: Pa) caused by the passage of the gas through the partition wall 11.

$$\Delta P = \Delta P_{inlet/exit} + \Delta P_{channel} + \Delta P_{wall} \quad \text{(i)}$$

Additionally, the relationship in Equation (ii) below is satisfied by $\Delta P_{inlet/exit}$, the opening area $A_{open}$ (unit: m$^2$) of the cell 12, the opening area $A_{in}$ (unit: m$^2$) of the cell 12 in the exhaust gas inflow side filter end surface 15, the gas flow velocity $V_{channel}$ (unit: m/s) in the cell 12, and an air density $\rho$ (unit: kg/m$^3$).

[Formula 1]

$$\Delta P_{inlet/exit} = \left(1 - \frac{A_{open}}{A_{in}}\right)^2 \cdot \frac{1}{2}\rho V_{channel}^2 + \left(0.04 - \left(\frac{1}{0.582 + \frac{0.0418}{1.1 - \left(\frac{A_{open}}{A_{in}}\right)^{-0.5}}}\right)\right)^2 \cdot \frac{1}{2}\rho V_{channel}^2 \quad \text{(ii)}$$

Additionally, the relationships in Equations (iii) to (viii) below are satisfied by $\Delta P_{channel} + \Delta P_{wall}$, the gas permeability coefficient k (unit: m$^2$), the length L (unit: m) of the exhaust gas purification filter 1 in the filter axial direction X, the hydraulic diameter $a_1$ (unit: m) of the cell 12, the thickness w (unit: m) of the partition wall 11, a coefficient of friction F (unit: non-dimensional) for the inside of the cell 12, a Reynolds number (unit: non-dimensional), a gas viscosity $\mu$ (unit: Pa·s), and the gas flow velocity $V_{channel}$ (unit: m/s). Note that in Equation (iii), "e" denotes an exponential function exp.

[Formula 2]

$$\Delta P_{channel} + \Delta P_{wall} = \left\{ \frac{(e^{g1}+1)(e^{g2}+1)(g_2-g_1)}{4(e^{g2}-e^{g1})} + \frac{A_2}{2} \right\} \cdot \frac{\mu V_{channel} a_1 w}{4Lk} \quad \text{(iii)}$$

[Formula 3]

$$g_1 = A_1 - \sqrt{A_1^2 + 2A_2} \quad \text{(iv)}$$

[Formula 4]

$$g_2 = A_1 + \sqrt{A_1^2 + 2A_2} \quad \text{(v)}$$

[Formula 5]

$$A_1 = \frac{k}{a_1 w}\frac{4L}{a_1}Re \quad \text{(vi)}$$

[Formula 6]

$$A_2 = \frac{4Fk}{a_1 w}\left(\frac{L}{a_1}\right)^2 \quad \text{(vii)}$$

[Formula 7]

$$Re = \frac{\rho V_{channel} a_1}{\mu} \quad \text{(viii)}$$

The pressure drop value is calculated based on Equations (i) to (viii) above. A dashed line based on calculated values indicated in the relationship diagram of the relationship between the gas flow velocity (X axis) and the pressure drop (Y axis) illustrated in FIG. 15 indicates calculated pressure drop values. As understood from Equations (i) to (viii), the pressure drop value is calculated by measuring the values other than the gas permeability coefficient k, including the filter length L, the opening area $A_{open}$ of the cell the hydraulic diameter $a_1$, and the thickness w of the partition wall 11, and these values are not changed even with a change in gas flow velocity. Consequently, by inputting any value of the gas permeability coefficient, the calculated value in the relationship diagram of the relationship between the gas flow velocity (X axis) and the pressure drop (Y axis) can be derived.

For example, inputting a large gas permeability coefficient value makes the pressure drop value smaller than the measured value, and the calculated value is smaller than the measured value. On the other hand, inputting a small gas permeability coefficient value makes the calculated value greater than the measured value. Thus, to approximate the calculated value to the measured value such that the calculated value is closest to the measured value, the least-square method is used to calculate the gas permeability coefficient k that minimizes the difference between the calculated value and the measured value. The calculated value corresponds to the gas permeability coefficient k. In other words, the gas permeability coefficient k is calculated backward, using Equations (i) to (viii), from the measured value of the pressure drop measured by the perm porometer. As described above, the gas permeability coefficients $k_{10}$ and $k_c$ can be determined for the predetermined position in a state in which a predetermined amount of ash components are accumulated in the exhaust gas purification filter 1.

The above-described exhaust gas purification filter 1 can produce sufficient effects by being used with catalysts carded in the partition wall 11, but can be used with no catalysts carried in the partition wall 11. Note that in a case where the catalysts are carried in the partition wall 11, the amount of catalysts is, for example, 30 g/L or more and 150 g/L or less. In general, the carried catalysts close some of the pores 110 in the partition wall 11. Additionally, various methods are available for carrying the catalysts, for example, the catalysts are homogeneously carried in the partition wall 11, many catalysts are carded in a front layer of the partition wall 11, and so on. Depending on these methods for carrying the catalysts, the PM collection rate may be increased or decreased. In the present disclosure, the surface opening diameter in the partition wall 11 surface is a technical point, and with this taken into account, the method for homogeneously carrying the catalysts in the partition wall 11 is preferable. Compared to the case where no catalysts are carried, the method for homogeneously carrying the catalysts in the partition wall 11 prevents a change in the ratio of the average surface opening diameter 110 of the pores in the partition wall 11 surface with respect to the average pore diameter of the partition wall 11. This leads to a tendency to reduce the PM collection rate, while increasing the initial pressure drop, but the effect of the pressure drop due to the pressure drop after the accumulation of the ash components 23 remains unchanged.

EXPERIMENT EXAMPLES

Exhaust gas purification filters in Examples and Comparative Examples will be described. In the present experiment examples, each exhaust gas purification filter includes, as a main component, cordierite with a chemical composition including $SiO_2$: 45 mass % or more and 55 mass % or less, $Al_2O_3$: 33 mass % or more and 42 mass % or less, and MgO: 12 mass % or more and 18 mass % or less. Note that the inclusion of cordierite as a main component means the inclusion of 50 mass % or more cordierite. Consequently, production of the exhaust gas purification filters in the present experiment examples uses a cordierite-forming material including an Si source, an Al source, and an Mg source such that cordierite is generated by baking the material.

Production of Exhaust Gas Purification Filter

Example 1

When the exhaust gas purification filter in Example 1 was produced, the cordierite-forming material was prepared by compounding porous silica (Si source), talc (Mg source), and aluminum hydroxide (Al source) in a compound ratio (mass %) indicated in Table 1.

Note that the porous silica used had a bulk density of 0.22 g/cm³. The bulk density was measured using a tap densitometer manufactured SEISHIN ENTERPRISE CO., LTD. and corresponding to a tap density method fluid adhesive force measuring instrument. Specifically, a cylinder of the measuring instrument was filled with silica, which was then compressed by tapping, and bulk density was calculated from the mass of the silica in the compressed state and the volume of the cylinder. Additionally, for aluminum hydroxide, both average particle sizes of 3 μm and 8 μm were used. "Average particle size" refers to a particle size corresponding to a volume integral value of 50% in a particle size distribution determined by a laser diffraction/scattering method.

A base material including a cordierite-forming material was prepared by adding water (solvent), methylcellulose (binder), and a dispersant to the cordierite-forming material in a compound ratio (mass %) indicated in Table 1, and mixing the components using a kneading machine. The dispersant described above mainly suppresses condensation of particles and improves a deflocculating property. Specifically, polyoxyethylene polyoxypropylene glyceryl ether having an average molecular weight of 4550 was used.

TABLE 1

| | Example 1 | |
|---|---|---|
| | Average Particle Size (μm) | Compound Ratio (mass %) |
| Porous Silica (Bulk Density 0.22 g/cm³) | 16 | 20.8 |
| Talc | 14 | 35.2 |
| Aluminum Hydroxide | 3 | 4.4 |
| Aluminum Hydroxide | 8 | 39.6 |
| Methyl Cellulose | — | 9 |
| Dispersant | — | 7 |
| Water | — | 63 |

In this regard, a material type using porous silica as in Example 1 includes a large number of gaps between the particles, requiring a large amount of solvent (in this case, water) for preparing a base material. To improve the deflocculating property in spite of having a large amount of solvent as described above, strongly kneading the base material is beneficial. However, it is difficult to directly check whether the particles are dispersed in the base material due to suppression of concentration of the particles by the kneading.

Thus, in the present experiment examples, a base material density deviation rate was introduced as a new indicator for particle dispersibility in the kneaded base material. Specifically, the base material is taken out before being extruded using a mold, and eight pieces of the base material are randomly extracted from the base material at the respective points. The extracted pieces of the base material are fed into a measuring instrument with a diameter of 25 mm and a length of 20 mm in a pressurization measuring instrument "Autograph" manufactured by Shimadzu Corporation. The pieces of the base material are compressed by pressurization of 1 kN, and a base material density is calculated from the volume and weight of the base material taken out. The average value of the base material densities calculated for the eight pieces of the base material from the respective points is designated as a measured base material density. In contrast, a base material density calculated from the compound ratio of the materials in advance is designated as a calculated base material density. By checking a difference (deviation rate) of the measured base material density from the calculated base material density, particle dispersibility can be determined. Wettability of the dispersant is degraded increasingly with decreasing measured base material density with respect to the calculated base material density. On the other hand, particle dispersibility is improved increasingly consistently with the closeness of the measured base material density to the value of the calculated base material density.

In Example 1, the speed of the kneading machine and the number of times the base material was repeatedly passed through the kneading machine were optionally varied to adjust the base material density deviation rate described below to less than 10%, and the resultant base material was used. Note that an increase in the speed of the kneading machine tends to reduce the base material density deviation rate. Additionally, the base material density deviation rate tends to be reduced by an increase in the number of times the base material is repeatedly passed through the kneading machine.

Base Material Density Deviation Rate (%)=100×{(Calculated Base Material Density)−(Measured Base Material Density)}/(Calculated Base Material Density)

The base material adjusted as described above was formed into a honeycomb shape by extrusion. The molding was dried and then cut into pieces each with predetermined length.

Then, the molding was baked at 1,430° C. to obtain a sintered body of a honeycomb structure.

Then, a dipping method was used to alternately fill the exhaust gas inflow end surface and the exhaust gas outflow end surface with slurry containing a ceramic material of the same type as that of the ceramic material of the sintered body of the honeycomb structure and to bake the exhaust gas inflow end surface and the exhaust gas outflow end surface to form the sealing portions.

As described above, the exhaust gas purification filter in Example 1 was produced.

Examples 2 to 8

In Example 1, the average particle size and the bulk density of the porous silica in the cordierite-forming material were changed. The pore diameter of the partition wall formed increases consistently with the average particle size of the porous silica, and the porosity of the partition wall formed increases with decreasing bulk density of the porous silica. Additionally, the surface opening ratio and the average surface opening diameter increase consistently with rate of an amount of aluminum hydroxide with a larger particle size in a compound of amounts of aluminum hydroxide with different particle sizes. Furthermore, increases in rate of temperature increase between 1,200° C. and 1,430° C. during baking enables an increase in average surface opening diameter. The production was based on a combination of these conditions. Note that the total compound ratio of aluminum hydroxide was the same as that in Example 1 and that the compound of amounts of aluminum hydroxide with different particle sizes was changed with the other compound ratio of the base material unchanged. Then, as is the case with Example 1, the speed of the kneading machine and the number of times the base material was repeatedly passed through the kneading machine were optionally varied to adjust the base material density deviation rate to less than 10%, and the resultant base material was used. By varying the rate of temperature increase between 1,200° C. and 1,430° C. the exhaust gas purification filters in Examples 2 to 8 were produced.

Example 9

In Example 1, the speed of the kneading machine and the number of times the base material was repeatedly passed through the kneading machine were optionally varied to adjust the base material density deviation rate to 10% or more, and the resultant base material was used to produce the exhaust gas purification filters in Example 9.

Examples 10 and 11

In Example 9, the average particle size and bulk density of the porous silica in the cordierite-forming raw material were changed. Examples 10 and 11 were otherwise similar to Example 9, and the exhaust gas purification filter in Examples 10 and 11 were produced by adjusting the base material such that the base material density deviation rate was 10% or more.

Comparative Example 1

For production of the exhaust gas purification filter in Comparative Example 1, the cordierite-forming material was prepared by compounding fused silica (Si source), talc (Mg source), aluminum hydroxide (Al source) in a compound ratio (mass %) indicated in Table 2. Note that the fused silica used has a bulk density of 1.35 g/cm$^3$.

Water (solvent), methyl cellulose (binder), lubricant, and graphite were added to the cordierite-forming material in a compound ratio indicated in Table 2 and mixed together using the kneading machine. Thus, a base material including the cordierite-forming material was produced. The lubricant is intended to reduce friction between the base material and metal portions of a molding machine and a mold surface, thus increasing a molding speed. As the lubricant, rapeseed oil was used that is an example of vegetable oil. Additionally, the base material density deviation rate was adjusted to less than 10%. The base material adjusted as described above was used and the subsequent procedure was executed as is the case with Example 1 to produce the exhaust gas purification filter in Comparative Example 1.

TABLE 2

|  | Comparative Example 1 | |
|---|---|---|
|  | Average Particle Size (μm) | Compound Ratio (mass %) |
| Fused Silica (Bulk Density 1.35 g/cm³) | 20 | 19.4 |
| Talc | 35 | 35.4 |
| Aluminum Hydroxide | 5 | 45.2 |
| Graphite | 25 | 30 |
| Methyl Cellulose | — | 9 |
| Lubticant | — | 5.5 |
| Water | — | 37 |

Comparative Examples 2 to 6

In Comparative Example 1, the average particle sizes of the fused silica and talc in the cordierite-forming material and the compound ratio of the graphite were changed. Comparative Examples 2 to 6 were otherwise similar to Comparative Example 1, and the exhaust gas purification filter in Comparative Examples 2 to 6 were produced by adjusting the base material such that the base material density deviation rate was less than 10%.

Measurement of Partition Wall Characteristics

For the exhaust gas purification filters in the examples and the comparative examples, the partition wall characteristics were measured. Specifically, the porosity of the partition wall and the average pore diameter of the partition wall were measured in accordance with the above-described measurement method. At this time, as the mercury porosimeter, an AutoPore IV9500 manufactured by Shimadzu Corporation was used. Additionally, in accordance with the above-described measurement method, the ratio of the average surface opening diameter of the pores in the partition wall surface to the average pore diameter of the partition wall, the presence ratio of the surface opening diameter of 25 μm or more of the pores in the partition wall surface, and the surface opening ratio of the pores in the partition wall surface were measured. At this time, as the SEM, a Quanta 250FEG manufactured by FEI Company was used. As the image analysis software, WinRoof Ver. 7.4 manufactured by MITANI CORPORATION was used. Additionally, in accordance with the above-described measurement method, the value of the gas permeability coefficient ratio $k_c/k_{10}$ in the exhaust gas purification filter was determined. At this time, as the perm porometer, a CEP-1100AXSHJ manufactured by Porous Materials Inc. was used.

Evaluation

For each exhaust gas purification filter, the initial PM collection rate, the initial pressure drop, and the pressure drop after accumulation of ash components were measured. Note that for the initial PM collection rate, the initial pressure drop, and the pressure drop after accumulation of ash components, an exhaust gas purification filter was used that had a cell structure with a physical constitution of φ118.4 mm (filter diameter)×L 120 mm (filter length), a partition wall thickness of 8.5 mil, and a cell number (cell density) of 300 cpsi.

Initial PM Collection Rate and Initial Pressure Drop

The initial PM collection rate was measured as follows. The exhaust gas purification filter was mounted in an exhaust pipe of a gasoline direction injection engine, and exhaust gas containing PM was caused to flow through the exhaust gas purification filter. At this time, $N_{in}$ and $N_{out}$ were measured, the $N_{in}$ indicating the PM number concentration in the exhaust gas before the exhaust gas flowing into the exhaust gas purification filter, and the $N_{out}$ indicating the PM number concentration in the exhaust gas flowing out from the exhaust gas purification filter. The initial PM collection rate was calculated based on the expression $100\times(N_{in}-N_{out})/N_{in}$. At this time, the measurement conditions included a temperature of 450° C. and an exhaust gas flow rate of 2.8 m³/min. For measurement of the PM number concentration described above, a PM particle number counter "AVL-489" manufactured by AVL was used. On the other hand, the initial pressure drop was measured as follows. Simultaneously with measurement of the initial PM collection rate, a pressure sensor was used to measure the pressure at a position preceding the exhaust gas purification filter (upstream) and the pressure at a position succeeding the exhaust gas purification filter (downstream), and the difference between the pressures was designated as the initial pressure drop. At this time, the measurement conditions included a temperature of 720° C. and an exhaust gas flow rate of 11.0 m³/min. It is to be noted that each exhaust gas purification filter that was in the initial state without any PM accumulated and was not coated with any catalysts was used for each measurement.

In the present experiment examples, cases where the initial PM collection rate was 70% or more were ranked as "A" because the initial PM collection rate was sufficiently achieved. Cases where the initial PM collection rate was 60% or more and less than 70% were ranked as "B" because the initial PM collection rate was achieved but to a lesser degree. Cases where the initial PM collection rate was less than 60% were ranked as "C" because the initial PM collection rate was not achieved. Additionally, cases where the initial pressure drop was 6 kPa or less were ranked as "A" because the effect of a reduction in initial pressure drop was sufficiently produced. Cases where the initial pressure drop was more than 6 kPa and 7 kPa or less were ranked as "B" because the effect of a reduction in initial pressure drop was produced but to a lesser degree. Cases where the initial pressure drop was more than 7 kPa were ranked as "C" because no effect of a reduction in initial pressure drop was produced.

Figure 16:
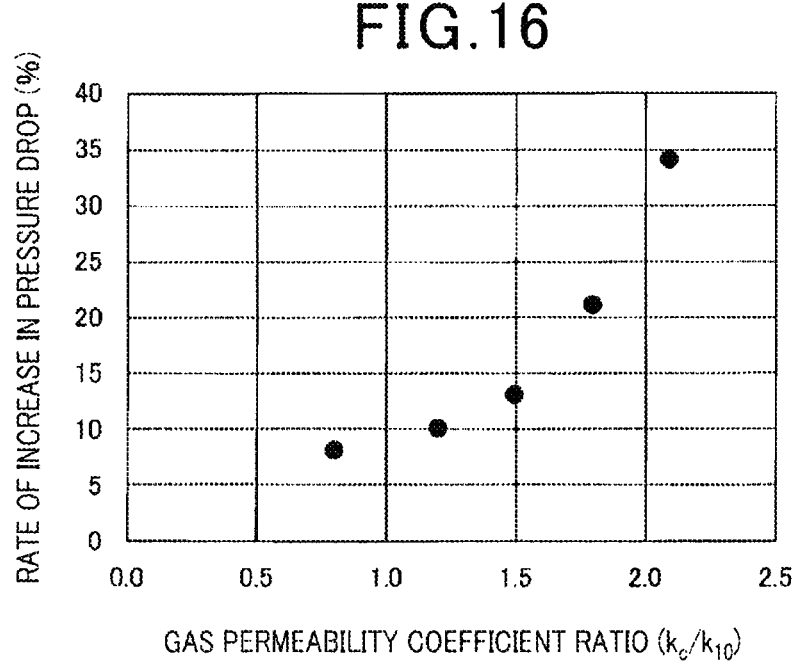
FIG. 16 is a diagram illustrating a relationship between a gas permeability coefficient ratio $k_c/k_{10}$ and a pressure drop increase rate, the relationship being obtained through an experiment example.

Pressure Drop after Accumulation of Ash Components 20 g/L or more and 40 g/L or less ash components were accumulated in an exhaust gas purification filter in the initial state in which no PM is accumulated in the exhaust gas purification filter and the exhaust gas purification filter not coated with any catalysts. The ash components were accumulated by activating the gasoline engine using gasoline containing 2% ash components derived from engine oil to accumulate ash components in the exhaust gas purification filter mounted in the exhaust passage. Specifically, the ash components were accumulated in the exhaust gas purification filter by repeating (1) PM accumulation and (2) PM recycling treatment; in the PM accumulation, in a stoichiometric atmosphere, the PM was accumulated for nine minutes with the central temperature of the exhaust gas purification filter set at 800° C., and in the PM recycling treatment, in an air atmosphere, the PM was subjected to the recycling treatment for one minute with the central temperature of the exhaust gas purification filter set between 800° C. and 900° C. At this time, the amount of ash components accumulated was recognized by extracting the exhaust gas purification filter and measuring the weight of the exhaust gas purification filter as appropriate. Subsequently, as is the case with the initial pressure drop described above, the pressure sensor was used to measure the pressure at a position preceding the exhaust gas purification filter and the pressure at a position succeeding the exhaust gas purification filter, and the difference between the pressures was designated as the pressure drop after accumulation of ash components (hereinafter, referred to as "the pressure drop after ash deposition" as appropriate). In the present experiment examples, cases where the pressure drop after ash deposition was 13 kPa or less when 30 g/L ash components were accumulated were ranked as "A" because the effect of suppression of an increase in pressure drop after accumulation of ash components was sufficiently produced. Similarly, cases where the pressure drop after ash deposition was more than 13 kPa and 15 kPa or less were ranked as "B" because the effect of suppression of an increase in pressure drop after accumulation of ash components was produced but to a lesser degree. Cases where the pressure drop after ash deposition was more than 15 kPa were ranked as "C" because the effect of suppression of an increase in pressure drop after accumulation of ash components was not produced. Additionally, assuming that the initial pressure drop is $P_{fresh}$ and the pressure drop after accumulation of ash components is $P_{ash\text{-}loaded}$, the pressure drop increase rate after accumulation of ash components with respect to the initial pressure drop was determined using the expression $100 \times (P_{ash\text{-}loaded} - P_{fresh})/P_{fresh}$. FIG. 16 illustrates a relationship between the gas permeability coefficient ratio $k_0/k_{10}$ and the pressure drop increase rate. Note that FIG. 16 illustrates results for the exhaust gas purification filter in Example 1 as a typical example.

Table 3 collectively indicates the results of the above-described experiments.

| | Base | | | Partition Wall | | | Evaluation | | |
|---|---|---|---|---|---|---|---|---|---|
| | Material Density Deviation Rate (%) | Porosity (%) | Pore Surface Opening Ratio (%) | Average Pore Diameter (μm) | Ratio of Average Surface Opening Diameter to Average Pore Diameter | Presence Ratio of Surface Opening Diameter of 25 μm or more (%) | $k_0/k_{10}$ | Initial PM Collection Rate | Initial Pressure Drop | Pressure Drop after Ash Deposition |
| Example 1 | <10 | 64.8 | 36.2 | 18.2 | 0.91 | 18.7 | ≤1.5 | A | A | A |
| Example 2 | <10 | 66.8 | 38.8 | 16.2 | 0.94 | 15.3 | ≤1.5 | A | A | A |
| Example 3 | <10 | 69.8 | 30.1 | 20.9 | 0.66 | 19.5 | ≤1.5 | A | A | A |
| Example 4 | <10 | 65.2 | 37.0 | 18.6 | 0.90 | 18.9 | ≤1.5 | A | A | A |
| Example 5 | <10 | 63.6 | 39.6 | 17.4 | 0.91 | 17.3 | ≤1.5 | A | A | A |
| Example 6 | <10 | 67.4 | 35.1 | 20.4 | 0.84 | 19.2 | ≤1.5 | A | A | A |
| Example 7 | <10 | 68.2 | 39.3 | 16.1 | 0.74 | 10.2 | ≤1.5 | A | A | A |
| Example 8 | <10 | 60.5 | 38.2 | 17.2 | 0.88 | 19.9 | ≤1.5 | A | A | A |
| Example 9 | 10≤ | 66.8 | 30.3 | 20.7 | 0.92 | 20.4 | ≤1.5 | B | B | B |
| Example 10 | 10≤ | 62.8 | 40.7 | 19.3 | 0.93 | 22.5 | ≤1.5 | B | A | B |
| Example 11 | 10≤ | 61.5 | 29.8 | 16.3 | 0.67 | 15.4 | ≤1.5 | A | B | B |
| Comparative Example 1 | <10 | 65.2 | 47.4 | 20.7 | 1.10 | 25.9 | 1.5< | C | B | C |
| Comparative Example 2 | <10 | 63.5 | 42.6 | 16.6 | 0.95 | 10.3 | 1.5< | B | B | C |
| Comparative Example 3 | <10 | 70.5 | 25.3 | 10.2 | 0.49 | 4.8 | 1.5< | A | C | C |
| Comparative Example 4 | <10 | 66.0 | 29.0 | 15.9 | 0.65 | 15.1 | 1.5< | A | B | C |
| Comparative Example 5 | <10 | 63.0 | 46.0 | 25.3 | 0.70 | 18.2 | 1.5< | C | B | C |
| Comparative Example 6 | <10 | 67.1 | 39.8 | 21.1 | 0.90 | 26.5 | 1.5< | C | B | C |

Table 3 confirms that the exhaust gas purification filters in Examples 1 to 11 enable a reduction in initial pressure drop, ensuring the initial PM collection efficiency, and suppression of an increase in pressure drop after accumulation of ash components, the exhaust gas purification filters being configured such that the average pore diameter of the partition wall and the ratio of the average surface opening diameter of the pores in the partition wall surface to the average pore diameter of the partition wall which respectively are within the specific numerical ranges defined in the present disclose.

In contrast, the exhaust gas purification filters in Comparative Examples 1 to 6 failed to achieve one or all of a reduction in initial pressure drop, ensuring the initial PM collection efficiency, and suppression of an increase in pressure drop after accumulation of ash components, the exhaust gas purification filters being configured such that the average pore diameter of the partition wall and the ratio of the average surface opening diameter of the pores in the partition wall surface to the average pore diameter of the partition wall which respectively do not fall within the specific numerical ranges defined in the present disclose.

A comparison between the exhaust gas purification filters in Examples 1 to 8 and the exhaust gas purification filters in Examples 9 to 10 indicates that the presence ratio of 20% or less the surface opening diameter of 25 µm or more of the pores in the partition wall surface makes PM containing ash components less likely to accumulate inside the partition wall, while making the ash components likely to become detached, facilitating suppression of an increase in pressure loss caused by ash components accumulated and remaining due to long-term use of the vehicle. In addition, the pore surface opening ratio of 30% or more in the partition wall surface facilitates production of the effect of reducing the initial pressure loss. The pore surface opening ratio of 40% or less in the partition wall surface makes PM containing ash components less likely to accumulate inside the partition wall, facilitating suppression of an increase in pressure loss caused by ash components accumulated and remaining due to long-term use of the vehicle. Additionally, a comparison between the exhaust gas purification filters in Examples 1 to 8 and the exhaust gas purification filter in Example 11 indicates that the pore surface opening ratio of 30% or more in the partition wall surface facilitates production of the effect of reducing the initial pressure loss. In addition, the pore surface opening ratio of 40% or less in the partition wall surface makes PM containing ash components less likely to accumulate inside the partition wall, facilitating suppression of an increase in pressure loss caused by ash components accumulated and remaining due to long-term use of the vehicle.

Note that the exhaust gas purification filters in Examples 1 to 9 had a gas permeability coefficient ratio $k_c/k_{10}$ of 1.5 or less even when 20 g/L or more and 40 g/L or less ash components were accumulated. This indicates that this configuration allows reliable suppression of an increase in pressure drop after accumulation of ash components as illustrated in FIG. 16.

The present disclosure is not limited to the above-described embodiments or experiment examples, and various changes may be made to the embodiments without departing from the spirits of the present disclosure. Additionally, the configurations in the embodiments and experiment examples can be optionally combined. In other words, the present disclosure has been described in compliance with the embodiments but it should be appreciated that the present disclosure is not limited to the embodiments, structures, or the like. The present disclosure also includes various modified examples and variations within the range of equivalents. In addition, the category of the present disclosure and the range of ideas of the present disclosure include various combinations and forms and further include other combinations and forms including only one more element, two or more elements, or a fraction of one element.

What is claimed is:

1. An exhaust gas purification filter configured to be disposed in an exhaust passage in a gasoline engine, the exhaust gas purification filter comprising:
    partition walls each comprising a plurality of pores;
    a plurality of cells partitioned by the partition walls; and
    sealing portions alternately sealing ends of the plurality of the cells in the exhaust gas purification filter, wherein the partition walls each:
        have an average pore diameter of more than 16 µm and less than 21 µm; and
        have a ratio of an average surface opening diameter of the pores in a partition wall surface to the average pore diameter of the partition wall of 0.66 or more and 0.94 or less,
    wherein:
    a length of the exhaust gas purification filter is longer than 20 mm in a filter axial direction;
    wherein the exhaust gas purification filter is configured and adapted so that, with accumulated ash components of 20 g/L to 40 g/L, an amount of the accumulated ash components is greater at a position of 10 mm from a filter end surface on an exhaust gas inflow side than at a central position between the filter end surface on the exhaust gas inflow side and a filter end surface on an exhaust gas outflow side; and
    a gas permeability coefficient ratio $k_c/k_{10}$ has a value in a range of 1.0 to 1.5, where $k_{10}$ is a gas permeability coefficient of the partition wall at the position of 10 mm from the filter end surface on the exhaust gas inflow side and $k_c$ is the permeability coefficient of the partition wall at the central position between the filter end surface on the exhaust gas inflow side and the filter end surface on the exhaust gas outflow side.

2. The exhaust gas purification filter according to claim 1, wherein
    a presence ratio of a surface opening diameter of 25 µm or more of the pores in the partition wall surface on the exhaust gas inflow side is 10% or more and 20% or less.

3. The exhaust gas purification filter according to claim 1, wherein
    a surface opening ratio of the pores in the partition wall surface on the exhaust gas inflow side is 30% or more and 40% or less.

4. The exhaust gas purification filter according to claim 1, wherein
    a porosity of the partition wall is 60% or more and 70% or less.

5. The exhaust gas purification filter according to claim 1, wherein
    a porosity of the partition wall is 63% or more and 66% or less.

* * * * *